United States Patent [19]

Blinken, Jr. et al.

[11] Patent Number: 5,099,510
[45] Date of Patent: Mar. 24, 1992

[54] TELECONFERENCING WITH BRIDGE PARTITIONING AND OTHER FEATURES

[75] Inventors: Robert J. Blinken, Jr., New York, N.Y.; Merle D. Garner, Chatham; Billy B. Oliver, Chatham, both of N.J.; Katharine Sensenig, Norristown, Pa.

[73] Assignee: Communications Network Enhancement Inc., New Providence, N.J.

[21] Appl. No.: 535,827

[22] Filed: Jun. 11, 1990

[51] Int. Cl.⁵ ............................................. H04M 7/00
[52] U.S. Cl. .................................... 379/202; 379/204
[58] Field of Search ............... 379/202, 203, 204, 205, 379/53, 54; 370/62

[56] References Cited

U.S. PATENT DOCUMENTS

| | | | |
|---|---|---|---|
| 4,509,167 | 4/1985 | Bantel et al. | 370/62 |
| 4,611,095 | 9/1986 | LeBlanc et al. | 379/203 |
| 4,796,293 | 1/1989 | Blinken et al. | 379/202 |

*Primary Examiner*—James L. Dwyer
*Assistant Examiner*—Ahmad F. Matar
*Attorney, Agent, or Firm*—Colucci & Umans

[57] ABSTRACT

A telephone conferencing method includes techniques for partitioning the multiple ports of a bridge into separate groups of ports which can each separately service a customer. Network management for the teleconferencing system includes displaying conference status and information to an operator or to a coordinator of a customer being services by the system. The information includes a conference name, the status of the conference, the name of a bridge for use to conduct the conference and the number of ports being used by the conference. Video conferencing is also possible with the designation of one voice leg and at least one and sometimes two data legs for each conferee to provide sufficient data handling capacity for transmitting and receiving video signals. An indication from a conferee that the conferee wishes to transmit a video signal causes the data legs of the transmitting conferee to be switched to a transmit mode while at least the data legs of the remaining conferees are switched to a listen only mode.

4 Claims, 2 Drawing Sheets

TELECONFERENCING WITH BRIDGE PARTITIONING AND OTHER FEATURES

FIELD AND BACKGROUND OF THE INVENTION

The present invention relates in general to telephone conferencing techniques, and in particular, to a new and useful teleconferencing system which is capable of partitioning the ports of a bridge among a plurality of customers, which includes improved network management for administrating and utilizing the system, and video conferencing capability.

In the field of telephone communications, a bridge is a micro-processor controlled device which has a multiplicity of ports that can be interconnected in a variety of ways for connecting multiple telephone lines to each other. Bridges are often used to establish multi-party conference calls. An enhanced dedicated teleconferencing system which is capable of establishing and controlling conference calls through a bridge is disclosed in U.S. Pat. No. 4,796,293 which is owned by the assignee of the present application and which is incorporated here by reference. This patent discloses a method and apparatus for teleconferencing which utilizes a service computer to advantageously manipulate and control the microprocessor in the bridge.

As the demand for conference call services increases, improvements are needed in the flexibility, responsiveness and data carrying capability of the service.

A bridge may include any number of ports, e.g. 240 ports, which can service as many calls. Many customers who may utilize telephone conferencing services may never have a need for all of the bridge's ports however. A need exists for a mechanism and technique which can utilize a single bridge with multiple ports to service more than one customer, with each customer using only some of the ports of the bridge.

Improvements are also needed in network management for telephone conferencing services to reduce the demands placed on customers during the setup and operation of a conference.

The ability to transmit not only voice communication but also data is also important. The above-identified U.S. Pat. No. 4,796,293 can accommodate data transfer through personal computers which are used in conjunction with telephones during a conference call. Recently, with the advent of video data transmission over regular telephone lines, even greater data transferring capacity is required. This problem is compounded in the environment of a conference call where multiple participants must be serviced.

SUMMARY OF THE INVENTION

The present invention comprises a method and apparatus in a teleconferencing system which is capable of partitioning the multiple ports of a single bridge into separate sets of ports which are each dedicated to a different customer. Each customer in effect has their own bridge with a dedicated reservation system, network management system, operator and billing. Each customer thus appears to have its own private conferencing system. Where more than one bridge is utilized, a single customer or partition, may include dedicated ports in each of the various bridges. Partitioning also insures security among the various user of the bridge or bridges.

Another feature of the present invention is the use of a network management system which displays to each operator and to a system administrator, the real time status of all active calls and all calls that are scheduled to start within a specified period of time (for example, within the next 5 minutes). The status of each conference is displayed including whether it is active, completed, in over time or past-due to start. The type of conference is also displayed from among various types of conferences which are available and which have been described in the above-identified patent. Also displayed is the method of starting the conference, e.g. a meetme, demand or time start conference. These methods of starting a conference have also been disclosed in the above-identified patent.

The name of each conference, the bridge and the number of ports that the conference is using are also displayed.

To accommodate video conferencing, the invention includes a method and apparatus of providing more than one port to a single conferee. One port may be used for voice communications for example, while one or two additional ports may be utilized for transmitting and receiving a video picture. The method includes a mechanism for allowing one conferee to transmit a video image and the other conferees to receive the image. This provides an interactive, multi-party video conferencing capability which adds a new dimension to teleconferencing. The present invention can be used with known video codec equipment that can transmit a video picture of fair quality at 56 kilo bits per second (KB/s). A single leg or port is capable of carrying 56 KB/s. For even better quality or the transmission of a large number of video images per unit time, some equipment requires two ports to transmit a total of 112 KB/s. The present invention can establish connection to each conferee of one voice port or leg and one or more data ports or legs so that both voice and video data can be transmitted or received simultaneously. To avoid confusion in transmitting voice and video data, one conferee can institute transmission of voice and video images and simultaneously cause all other conferees to be placed in a "listen only mode" for receiving the voice and video information.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTIONS OF THE DRAWING

In the drawings:

FIG. 1 is a schematic block diagram showing the apparatus of the present invention; and FIG. 2 is a schematic diagram showing the partitioning of two bridges and a hierarchy of access and control.

DESCRIPTION OF THE PREFERRED EMBODIMENTS

Figure 1:
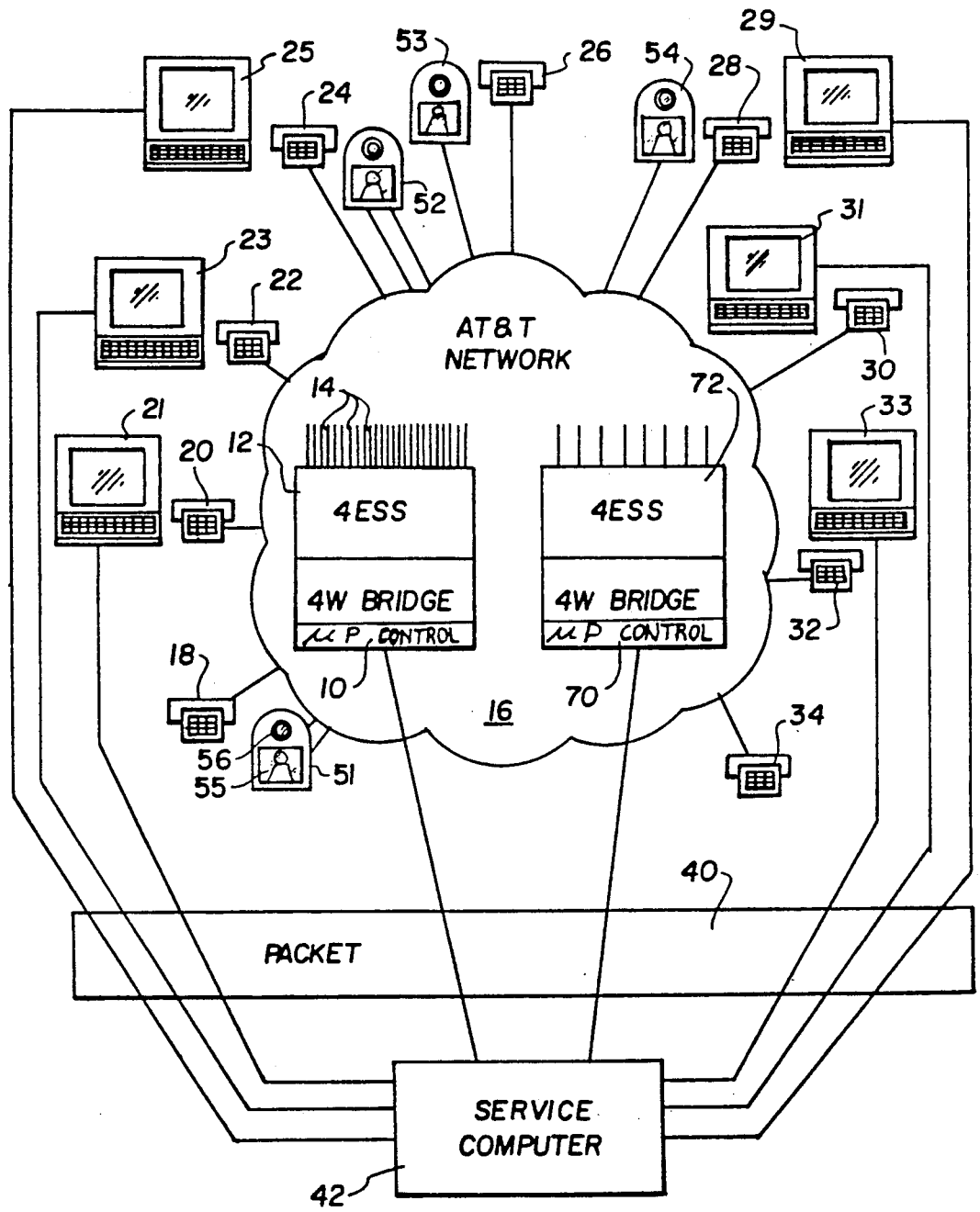

Referring to the drawing in particular, the apparatus and method of the present invention involves the use of one or more bridges 10 and 70 which are operated by a service computer 42 which may be in the form of a personal computer. Each bridge includes an internal microprocessor control system, and is connected to a 4ESS toll switch apparatus 12 and 72 which has a number of ports equal in number to those of the bridge. Bridge 10 may, for example, include 240 ports while bridge 70 may have 56 ports.

Each port 14 of each bridge can be connected by the existing AT&T or other telephone network 16, to an equal number of telephone lines shown radiating from the network. In this way, each of a plurality of telephones 18, 20, 22, 24, 26, 28, 30, 32 and 34, assigned to separate conferees, can be connected to establish a telephone conference among the conferees. As disclosed in U.S. Pat. No. 4,796,293, some of these telephones may be associated with computer terminals or personal computers 21, 23, 25, 29, 31 and 33, which can be used by a conferee in conjunction with his or her telephone.

In accordance with the present invention, video conferencing is also possible. For this purpose, those conferees who will be participating in the video conference will have available a video device shown at 51, 52, 53 and 54, which can be used in conjunction with the telephone or audio device of the conferee and, if the conferee is so equipped, the conferee computer terminal or personal computer. The video devices 51-54 are of known design and include a screen 55 for viewing a video image produced by video signals formed from an image which is picked up by a lens 56 provided in each video device.

Depending on the video device, either one or two telephone lines are used to connect the video device to the telephone network 16. One telephone line is capable of carrying 56 KB/s of data which is sufficient for some video equipment. Other video equipment or a higher quality image or higher image change rate requires two telephone lines which can carry a total of 112 KB/s of video signal. An example of video devices 51-54 is the Compression Labs video terminals which are commercially available.

Reserving conferences for initiation at a future date, and starting conferences at a present time, can be controlled either by an operator at the service computer 42, or a customer at anyone of the terminals, for example terminal 25. A customer can also initiate a conference using a touchtone telephone, where no terminal is available to the customer.

Potential conferees can be provided in advance with a ("meetme") access code which can be used by the conferees to call into a conference within a specified time period. The conferee would be recognized by the conference through the code. Conferees can also be called by the service computer. Each conferee to be called can be listed on a pre-established directory associated with a particular conference. The directory includes conferee name and telephone number and meetme code in the case of meetme conferees who are expected to dial into the conference. This information can also be listed on the terminal of the operator at the service computer 42, as well as the terminals at the conferees having terminals. Another mechanism for connecting a conferee to a conference is on an adlib basis. An operator or a customer can call a conferee on an adlib basis once the telephone number of the adlib conferee is known.

The only limitation on all conferences is that the total number of ports in use at any time cannot exceed the bridge(s) capacity. A further limitation can be placed on all conferences by using the reservation system to specify in advance the number of ports to be allocated for one or more conferences. In this way, "over-booking" is prevented by providing for enough ports to service all conferees whether they are added from a directory, on an adlib basis, or dial in on a meetme basis.

In order to insure that each customer and each conference for a particular customer is provided with a sufficient number of ports, without monopolizing the multiple ports of an entire bridge (if a customer does not need that many ports), the present invention includes a technique of partitioning the ports of a bridge into separate groups of ports, each group of ports being assignable to a separate customer. All conferencing information, management and billing is limited to the customer's group of ports. In this way, a multiport bridge can accommodate several customers. This makes the use of the bridge more economical for each customer while permitting multiple customers to be serviced by a single bridge.

Network management for the conferencing system of the present invention is set up so that multiple operators have access to sufficient information and commands to operate the system. Each operator may access a database menu which in turn allows the operator to access and manipulate customer information, conference information and conferee information.

Figure 2:
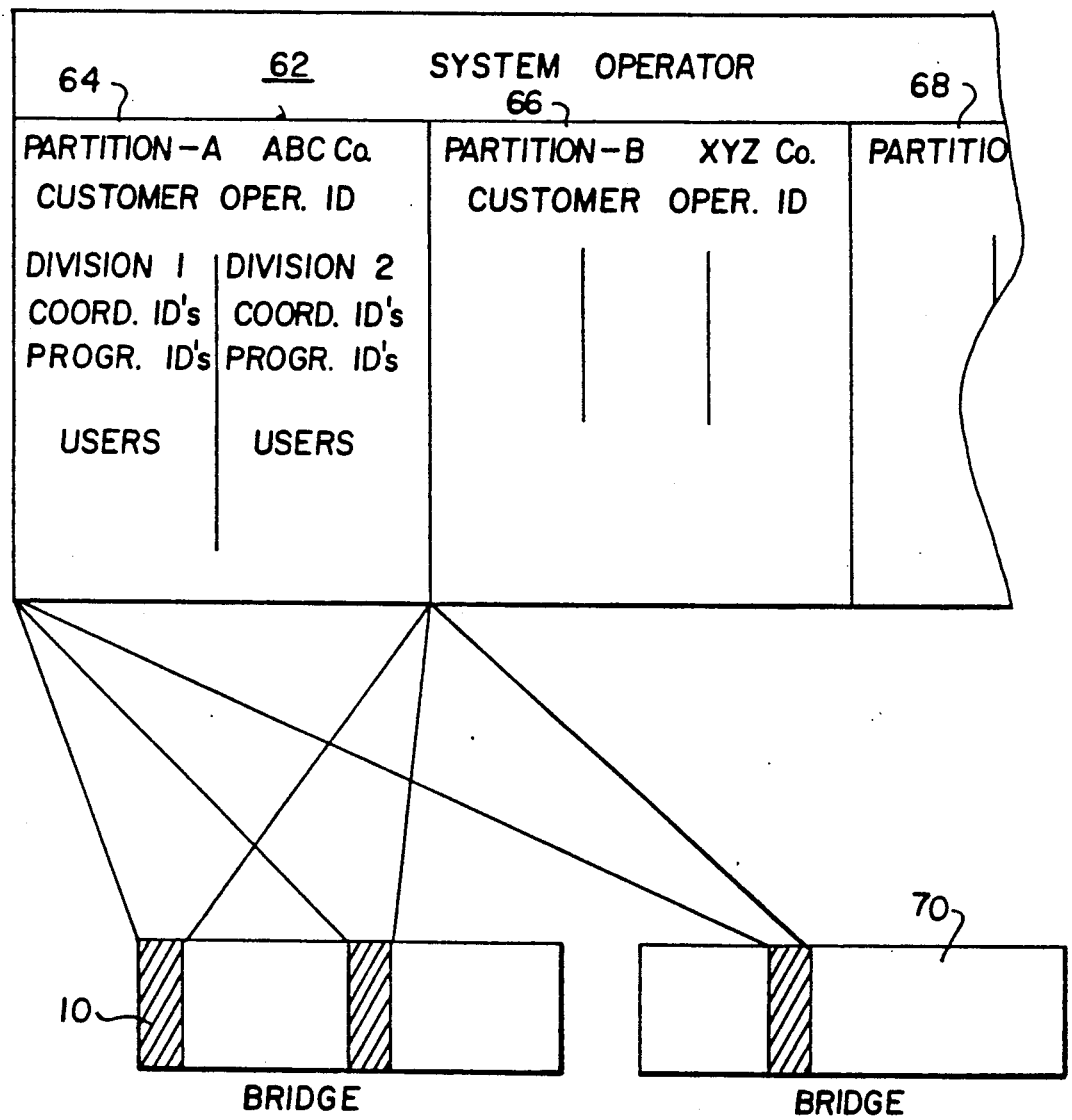

Several customers can be serviced by a single system operator, the database including customer name, address, the name of a contact person at the customer assuming the customer is a company, a contact telephone number, as well as billing name and address for the customer. A customer may be added, deleted or changed from a customer maintenance menu which also includes access to records on multiple customer operators which can be designated for each customer Each customer operator can manipulate a conference much the way a system operator can. Similarly, each customer operator can add, delete, or change information on multiple customer and progressive coordinators. Each customer coordinator can manipulate a conference much the way a customer operator can. To allow the customer coordinator access to the system, each customer coordinator record includes a login ID, as well as the customer coordinator's first and last name. The customer operators and coordinators require computer terminals or personal computers for operating the teleconference service. The customer maintenance menu also allows for the inclusion of a progressive coordinator(s) into the system who can operate a conference using a touch tone telephone without a terminal or personal computer. A progressive coordinator record includes the name of the progressive coordinator as well as the progressive coordinator's telephone number and a progressive code which allows access of the progressive coordinator into the teleconferencing system, and provides for appropriate billing to the correct customer FIG. 2 is a schematic diagram illustrating the hierarchical relationship between the operators and coordinators who, with the system operator and the individual participates or users of a conference, have different levels of control and access to the conferences and to the use of ports in the bridge or bridges.

Each level except for the individual participants in most cases, has access using an individual ID code. The system operator 62 has full access to all ports in both bridges 10 and 70. The system operator coordinates and permits access through ID codes to the various participants of the system. In FIG. 2, two partitions 64 and 66 are shown which each have access to different collections of ports (shown as shaded areas) from among bridges 10 and 70. The groups of ports partition or subscriber 64, designated PARTITION A and used by subscriber ABC Company, is shown having access to two groups of ports in bridge 10 and one group of ports in bridge 70. An allocation of different groups of ports among the two bridges is also established for partition 64, XYZ Company but this is not shown in detail. Area 68 in the diagram may receive other partitions, for other companies or subscribers.

Returning to partitions 64, the highest access and control is provided to the customer operator. Subdivisions for individual customers shown at DIVISION 1 and DIVISION 2 form the third level of access to the bridge ports. "Customer" in the system of the present invention refers to a partition for billing purposes only. All customers (e.g. DIVISION 1 and DIVISION 2) have access to all ports of that partition as shown schematically in FIG. 2. One or more coordinators with individual coordinator ID is provided for each customer (again DIVISION 1 or DIVISION 2) with one or more progressive coordinators being provided for each customer as well. The coordinator's access is superior to the progressive coordinator's access. Under the progressive coordinator's access is the access afforded to individual participants or users of the system, through conference calls or other uses.

A customer operator or coordinator may also access a conference status menu which is illustrated below.

meaning that either a customer coordinator or an operator will have to start the conference.

PAST (Flashing)—This indicates the conference has been scheduled, has not started and is past its scheduled start time.

ACTIVE—This indicates the conference has started and is active.

PROG—This indicates the conference is a progressive conference initiated by a progressive coordinator.

REQ ATT (Flashing)—This indicates one of the conferees on an active conference has pressed the "0" key on their telephone requesting operator assistance.

OVER T—This indicates the conference is still active and has gone beyond its reserved duration.

COMP—This indicates the conference has ended but is still within the reserved time. When the reserved time expires the conference will be removed from the status screen.

The Name field contains the conference name which will contain the same name as the name used to reserve the conference. However, there are two exceptions. The name for an adlib call initiated by a customer coordinator will contain an "X" and the telephone number of the customer coordinator. The name for a progressive call, initiated by a progressive coordinator, will contain a "P" and the telephone number from the progressive coordinator record.

The "Brdg" or bridge field contains the name of the bridge the conference is either scheduled to be performed on or was actually initiated on.

CONFERENCE STATUS MENU
Date: 12/09/89    Time: 13:41

| Status | Name | Brdg | Ports | | Status | Name | Brdg | Ports |
|---|---|---|---|---|---|---|---|---|
| 1. ACTIVE | Board | ARL1 | 3 | 16. | | | | |
| 2. TIME | West | NY1 | 0 | 17. | | | | |
| 3. MEETME | Green | CIN1 | 0 | 18. | | | | |
| 4. PAST | CCS1 | CIN1 | 0 | 19. | | | | |
| 5. REQATT | TEST1 | ARL1 | 5 | 20. | | | | |
| 6. ACTIVE | X2014645588 | NY1 | 10 | 21. | | | | |
| 7. COMP | Violet | CIN1 | 0 | 22. | | | | |
| 8. OVER T | White | NY1 | 6 | 23. | | | | |
| 9. ACTIVE | Yellow | NY1 | 14 | 24. | | | | |
| 10. PAST | Black | CIN1 | 0 | 25. | | | | |
| 11. ACTIVE | Purple | ARL1 | 4 | 26. | | | | |
| 12. PROG | P2014645589 | ARL1 | 6 | 27. | | | | |
| 13. DEMAND | Red | NY1 | 0 | 28. | | | | |
| 14. PROG | P5134973250 | CIN1 | 0 | 29. | | | | |
| 15. ACTIVE | Blue | ARL1 | 12 | 30. | | | | |

ARL1 que: 0  NY1 que: 0
(M)onitor or start conference   (R)espond to request   (C)onference status
<ESC>ape  PF1 - prev PG  PF2 - next PG  PF3 - first PG  PF4 - last PG

| F1 m oper | F2 m oper | F3 m oper | F4 m oper | F5 m oper | F6 m oper | F7 m oper | F8 m oper |
|---|---|---|---|---|---|---|---|

The Status field contains the current status of the listed conference.

TIME—This indicates the conference has been scheduled and the conference is a time start, meaning the conference will start automatically at the scheduled time.

MEETME—This indicates the conference has been scheduled and the conference is a meetme start, meaning the conference will be started when the first meetme conferee calls into the bridge and connects with the conference.

DEMAND—This indicates the conference has been scheduled and the conference is a demand start, The Ports field contains a count of the number of active ports on each conference.

Conferees dialing into the conference bridge may request operator assistance by pressing their "0" key. At that point a "REQ ATTEN" message will appear at the right-hand bottom of the operator screen. The request will increment a queue counter for the bridge which the customer has called. Any operator may connect to the incoming conferee by pressing (R)espond to Request and selecting the appropriate bridge. The system will call the operator telephone and connect to the first conferee who requested attention. If the operator telephone is already off-hook, the system simply connects the operator telephone to the conferee port which is being responded to. The operator telephone is never disconnected unless physically hung up (placed on-hook) by the operator. If there are additional requests outstanding for the selected bridge the operator may go to the next request by selecting the (o)n command.

Up to 30 conferences can be viewed on a single Status Menu page. The menu includes multiple pages. In the system operated according to the present invention, up to 125 concurrent conferences can be viewed on multiple pages of the Conference Status Menu.

The (C)onference status command is utilized to display more information on a selected conference, including the name of the bridge, the type of conference, the reserved and actual beginning and end date and time for the conference and the number of ports the conference can utilize.

According to the present invention, each customer along with its one or more customer coordinators and/or progressive coordinators, as well as all reserved conferences are stored as a unit and are associated with a group of ports which are partitioned from multiple ports of a bridge. In this way, the customer appears to have full access to a bridge having the number of ports in its partition, without affecting or interacting with any other customer which may be using a different group of ports on the same bridge. Where multiple bridges are available, a single customer may have one or more groups of ports on one bridge and other groups of ports with multiple customers using the same set of bridges, again without interfering with each other.

To serve conferences, any operator or customer coordinator can call up a conference maintenance menu which, in turn, provides them with access to displays that permit adding, deleting, changing and performing other services for conferences. Following is the conference maintenance menu as well as an ADD Conference Record that can be selected from that menu.

Using up and down keys, each entry can be accessed and filled in. The entry "Type of data:" is filled in with either VOICE or DATA. For a video conference, a single conferee would be provided with one voice port and one or two data ports. A data port is configured so that it can receive 56 KB/s data for transmitting and receiving video signals in accordance with the present invention.

The entry "Meetme code:" receives a six digit code to be used by a conferee who will be calling into the conference and utilizing the code. At the "Meetme assist:" location, entry of "A" indicates assist. When an assisted customer meetme conferee calls a recorded announcement is played asking the conferee to wait, and the call is transferred to an operator who takes the conferee's name down and connects the conferee to the conference. A "U" indicating unassist, allows the meetme conferee to be directly connected into the conference upon successful entry of their meetme code.

```
<ESC> to exit                                                    <PF4> for help
                       CONFERENCE MAINTENANCE MENU
                              Add Conference
                              Delete Conference
                              Change Conference
                              List Conference
                              Delete Conferees In Conference
                              Add Conferees To Conference
                              Add Conferees to Conference Directory
                              Change Conferees in Conference Directory
                              Delete Conferees from Conference Directory
                              COMMAND>>_
```

| F1 | F2 | F3 | F4 | F5 | F6 | F7 | F8 |
|---|---|---|---|---|---|---|---|
| m oper | m oper | m oper | m oper | m oper | m oper | m oper | m oper |

After selecting "Add Conference" you will see:

```
                            ADD Conference Record
        Conference Name: _                      Expiration date:
        Conference Type:                              Bridge ID:
        Conference Date:                          Billing Bridge:
              Login Id:                             How to Start:
             Start Time:                          Number of ports:
              Duration:                              Type of data:
       Recurring interval:                     Number of Data Lines:
                                                    Meetme code:
                                                   Meetme assist:
<ESC> - Exit Operation                    <PF1> - Perform Operation
```

| F1 | F2 | F3 | F4 | F5 | F6 | F7 | F8 |
|---|---|---|---|---|---|---|---|
| m oper | m oper | m oper | m oper | m oper | m oper | m oper | m oper | on another bridge as part of their partition. In this way each customer may have access to more than one bridge After a conference record is completed, the system will return the following display:

```
                            ADD Conference Record
        Conference Name: Black            Expiration date: 12/09/89
        Conference Type: Preset                  Bridge ID: CIN1
        Conference Date: 12/09/89           Billing Bridge: CIN1
              Login Id: nite4326             How to Start: Demand
             Start Time: 13:30             Number of ports: 10
              Duration: 75                    Type of data: voice
       Recurring interval: 0              Number of Data Lines: 0
```

-continued

```
                              Conferee Record
Conferee First Name:___                    Conferee Last Name:
Primary Telephone Number:
Secondary Telephone Number:
Login ID:   Segment No:   Meetme Code:Yes/No   Meetme assist:
            <ESC> - Exit Operation         <PF1> - Perform Operation
```

| F1 m oper | F2 m oper | F3 m oper | F4 m oper | F5 m oper | F6 m oper | F7 m oper | F8 m oper |
|---|---|---|---|---|---|---|---|

This display can be used to fill in multiple conferees at the bottom.

Where video conferencing is supported, the following record is returned for filling in video conferees.

For video conferees one voice and one or two data telephone numbers must be designated as well as a conference segment for each number.

In operating a video conference, if for example the conferee with the video device 51 wishes to be seen, he or she presses "0" on the key pad of the audio device or telephone 18. This transmits a signal to the service computer 42 which automatically switches or maintains the data and video lines to a transmit (transmit or receive) mode, and converts all other data lines of all other conferees into a listen only or receive only mode. In this way the video signal from device 51, which is picked up by lens 56, is transmitted to all other video devices 52, 53 and 54, which cannot at that instant transmit a video signal. The audio or voice lines may be maintained on a talk plus listen or listen only mode.

```
                          ADD Conference Record
     Conference Name: Black              Expiration date: 12/09/89
     Conference Type: Preset                   Bridge ID: CIN1
     Conference Date: 12/09/89               Billing Bridge: CIN1
            Login Id: nite4326                How to Start: Demand
          Start Time: 13:30                 Number of ports: 10
            Duration: 75                      Type of data: data
   Recurring interval: 0                  Number of Data Lines: 2
                               Conferee Record
Conferee First Name:___              Conferee Last Name:___
             Voice Telephone Number:___     Segment No:___
             First Data Telephone No:___    Segment No:___
             Second Data Telephone No:___   Segment No:___
     <ESC> - Exit Operation              <PF1> - Perform Operation
```

| F1 m oper | F2 m oper | F3 m oper | F4 m oper | F5 m oper | F6 m oper. | F7 m oper | F8 m oper |
|---|---|---|---|---|---|---|---|

An operator or customer coordinator can also effect the mode of all conferees by issuing a change mode command plus the appropriate conference leg designation from his or her PC or terminal keyboard.

Since the service computer 42 can switch conference ports from a talk to a listen mode rapidly (in less than a second for all conferees) the capacity to transmit a video image can be switched from one conferee to another quickly. This improves the interactive nature of the conference and makes it more like a live meeting among the conferees.

While specific embodiments of the invention have been shown and described in detail to illustrate the application of the principles of the invention, it will be understood that the invention may be embodied otherwise without departing from such principles.

What is claimed is:

1. A method of operating a telephone line bridge from a service computer, the bridge having a multiplicity of ports, each connectible to a separate telephone line, and an internal microprocessor control connected to the service computer and for controlling the ports, for conducting conferences for a plurality of customers using the service computer, the method comprising:

dividing the multiplicity of ports into a plurality of partitions each containing a group of ports, using software in the service computer;

designating at least one partition for each of the plurality of customers, using software in the service computer;

operating the bridge for each customer through the service computer;

storing in a data base in the service computer for each customer unique customer information for using the ports in the customer's partition, the customer partition and billing information for that customer;

maintaining security between each data base in the service computer so that one customer cannot access any customer information or partition of another customer; and operating the bridge to conduct telephone conferences for each customer using ports in at least one customer's designated partition, by controlling the internal microprocessor control using the service computer.

2. A method according to claim 1 including storing in each data base, information concerning conferences to be conducted for the customer corresponding to that data base, and information on conferees to be included in the conferences.

3. A method according to claim 1 including designating a login ID for each customer, identifying each login ID with a separate partition, and transmitting the login ID to the service computer from a customer for accessing the ports of the partition designated to that customer.

4. A method according to claim 1 including operating at least one second telephone line bridge having a multiplicity of ports, dividing the multiplicity ports of the second bridge into a plurality of partitions each containing a group of ports, and designating one partition from the additional bridge for each of the customers so that each customer is designated a partition in each bridge, and operating each bridge to conduct teleconferences for each customer using ports from partitions designed to that customer only.

* * * * *